(12) United States Patent
Lee et al.

(10) Patent No.: US 12,387,879 B2
(45) Date of Patent: Aug. 12, 2025

(54) MULTILAYER ELECTRONIC COMPONENT AND METHOD OF MANUFACTURING MULTILAYER ELECTRONIC COMPONENT

(71) Applicant: SAMSUNG ELECTRO-MECHANICS CO., LTD., Suwon-si (KR)

(72) Inventors: Ji Hyeon Lee, Suwon-si (KR); Jong Ho Lee, Suwon-si (KR); Eun Jung Lee, Suwon-si (KR); Yong Min Hong, Suwon-si (KR); Yong Park, Suwon-si (KR); Min Woo Kim, Suwon-si (KR); Jung Tae Park, Suwon-si (KR); Sun Mi Kim, Suwon-si (KR); Sim Chung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 207 days.

(21) Appl. No.: 18/205,104

(22) Filed: Jun. 2, 2023

(65) Prior Publication Data

US 2024/0145173 A1 May 2, 2024

(30) Foreign Application Priority Data

Nov. 2, 2022 (KR) .......................... 10-2022-0144445

(51) Int. Cl.
*H01G 4/30* (2006.01)
*H01G 4/012* (2006.01)
*H01G 4/232* (2006.01)

(52) U.S. Cl.
CPC ............... *H01G 4/30* (2013.01); *H01G 4/012* (2013.01); *H01G 4/232* (2013.01)

(58) Field of Classification Search
None
See application file for complete search history.

(56) References Cited

U.S. PATENT DOCUMENTS

| 11,049,654 | B2 * | 6/2021 | Park ........................ H01G 4/012 |
| 2013/0222972 | A1 * | 8/2013 | Saito ....................... H01G 4/005 361/301.4 |

(Continued)

FOREIGN PATENT DOCUMENTS

| JP | 2001-297945 A | 10/2001 |
| JP | 2008-189530 A | 8/2008 |

(Continued)

OTHER PUBLICATIONS

Office Action issued on Jul. 30, 2024 in the corresponding Japanese Patent Application No. 2023-095794 with English translation.

*Primary Examiner* — Dion R. Ferguson
(74) *Attorney, Agent, or Firm* — Morgan, Lewis & Bockius LLP

(57) ABSTRACT

A method of manufacturing a multilayer electronic component, the method includes, attaching a margin portion green sheet including a ceramic material, a photocuring agent, and a photoinitiator to at least one end surface of each of the plurality of cut ceramic green sheet stacked bodies in the third direction, an energy irradiation operation of irradiating, with energy, the margin portion green sheet to generate a photocuring polymerization reaction between the photocuring agent and the photoinitiator.

17 Claims, 8 Drawing Sheets

(56) References Cited

U.S. PATENT DOCUMENTS

| | | | | |
|---|---|---|---|---|
| 2014/0301012 | A1* | 10/2014 | Kim | H01G 4/1209 |
| | | | | 361/301.4 |
| 2015/0340155 | A1* | 11/2015 | Fukunaga | H01G 4/30 |
| | | | | 361/301.4 |
| 2019/0189352 | A1* | 6/2019 | Yamato | H01G 4/30 |
| 2020/0027661 | A1* | 1/2020 | Park | H01G 4/12 |
| 2022/0199325 | A1 | 6/2022 | Chikuma | |
| 2024/0145173 | A1* | 5/2024 | Lee | H01G 4/30 |

FOREIGN PATENT DOCUMENTS

| | | | | |
|---|---|---|---|---|
| JP | 2020013974 | A * | 1/2020 | H01G 2/065 |
| JP | 2022-056752 | A | 4/2022 | |
| JP | 2022-099069 | A | 7/2022 | |

* cited by examiner

MULTILAYER ELECTRONIC COMPONENT AND METHOD OF MANUFACTURING MULTILAYER ELECTRONIC COMPONENT

CROSS-REFERENCE TO RELATED APPLICATION(S)

This application claims benefit of priority to Korean Patent Application No. 10-2022-0144445 filed on Nov. 2, 2022 in the Korean Intellectual Property Office, the disclosure of which is incorporated herein by reference in its entirety.

TECHNICAL FIELD

The present disclosure relates to a multilayer electronic component and a method of manufacturing the multilayer electronic component.

BACKGROUND

A multilayer ceramic capacitor (MLCC), a multilayer electronic component, is a chip-type condenser mounted on the printed circuit boards of various types of electronic products such as imaging devices, including a liquid crystal display (LCD) and a plasma display panel (PDP), computers, smartphones, and mobile phones, and serves to charge or discharge electricity therein or therefrom.

The multilayer ceramic capacitor may be used as a component of various electronic devices due to having a small size, ensuring high capacitance and being easily mounted. With the miniaturization and implementation of high output power in various electronic devices such as computers and mobile devices, demand for miniaturization and implementation of high capacitance of multilayer ceramic capacitors has also been increasing.

In order to achieve miniaturization and implement high capacitance of the multilayer ceramic capacitor, an internal electrode may be exposed in a width direction of a body, thereby maximizing an area of the internal electrode in the width direction through a design without margin portions. After such a chip is manufactured, a method of completing the multilayer ceramic capacitor by separately attaching a margin portion to an exposed surface of an electrode in the width direction of the chip has been applied before sintering.

However, high heat and pressure may be involved in the process of attaching the margin portion. Such heat and pressure may cause deformation of the multilayer ceramic capacitor, thereby increasing a defect rate.

SUMMARY

An aspect of the present disclosure is to improve the completeness of a multilayer electronic component by minimizing defects in a margin portion that may occur when the margin portion is attached.

However, the aspects of the present disclosure are not limited to the above, and will be more easily understood in the process of describing specific example embodiments of the present disclosure.

According to an aspect of the present disclosure, there is provided a method of manufacturing the multilayer electronic component, the method including preparing a first ceramic green sheet on which a plurality of first internal electrode patterns are formed at predetermined intervals and a second ceramic green sheet on which a plurality of second internal electrode patterns are formed at predetermined intervals, forming a ceramic green sheet stacked body by alternately stacking the first ceramic green sheet and the second ceramic green sheet in a first direction such that the first internal electrode pattern and the second internal electrode pattern overlap each other, cutting the ceramic green sheet stacked body such that ends of the first and second internal electrode patterns are exposed in a third direction, when a direction in which the first and second internal electrode patterns have a larger size is defined as a second direction and a direction in which the first and second internal electrode patterns have a smaller size is defined as the third direction, disposing, on an elastic pad to which an adhesive is attached, a plurality of cut ceramic green sheet stacked bodies to be spaced apart from each other, attaching a margin portion green sheet including a ceramic material, a photocuring agent, and a photoinitiator to at least one end surface of each of the plurality of cut ceramic green sheet stacked bodies in the third direction, an energy irradiation operation of irradiating, with energy, the margin portion green sheet to generate a photocuring polymerization reaction between the photocuring agent and the photoinitiator, and preparing a body including a dielectric layer, a first internal electrode, and a second internal electrode and a margin portion by sintering the cut ceramic green sheet stacked body to which the margin portion green sheet is attached.

According to another aspect of the present disclosure, there is provided a multilayer electronic component including a body including an active portion having capacitance formed by including a dielectric layer and first and second internal electrodes alternately disposed in a first direction with the dielectric layer interposed therebetween, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction, first and second external electrodes disposed on the outside of the body in the second direction to be connected to the first and second internal electrodes, respectively, and a margin portion disposed on both end surfaces of the active portion in the third direction. $\angle WT$ may satisfy $90.0° \pm 0.5°$, where among outermost edges of cross-sections of the body in the first and third directions, an extension line of an edge in the first direction is defined as T, an extension line of an edge in the third direction is defined as W, and an angle defined by T and W is defined as $\angle WT$.

According to example embodiments of the present disclosure, the completeness of a multilayer electronic component may be improved by minimizing defects in a margin portion.

The various and beneficial advantages and effects of the present disclosure are not limited to those set forth herein, and will be more easily understood in the course of describing specific example embodiments.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
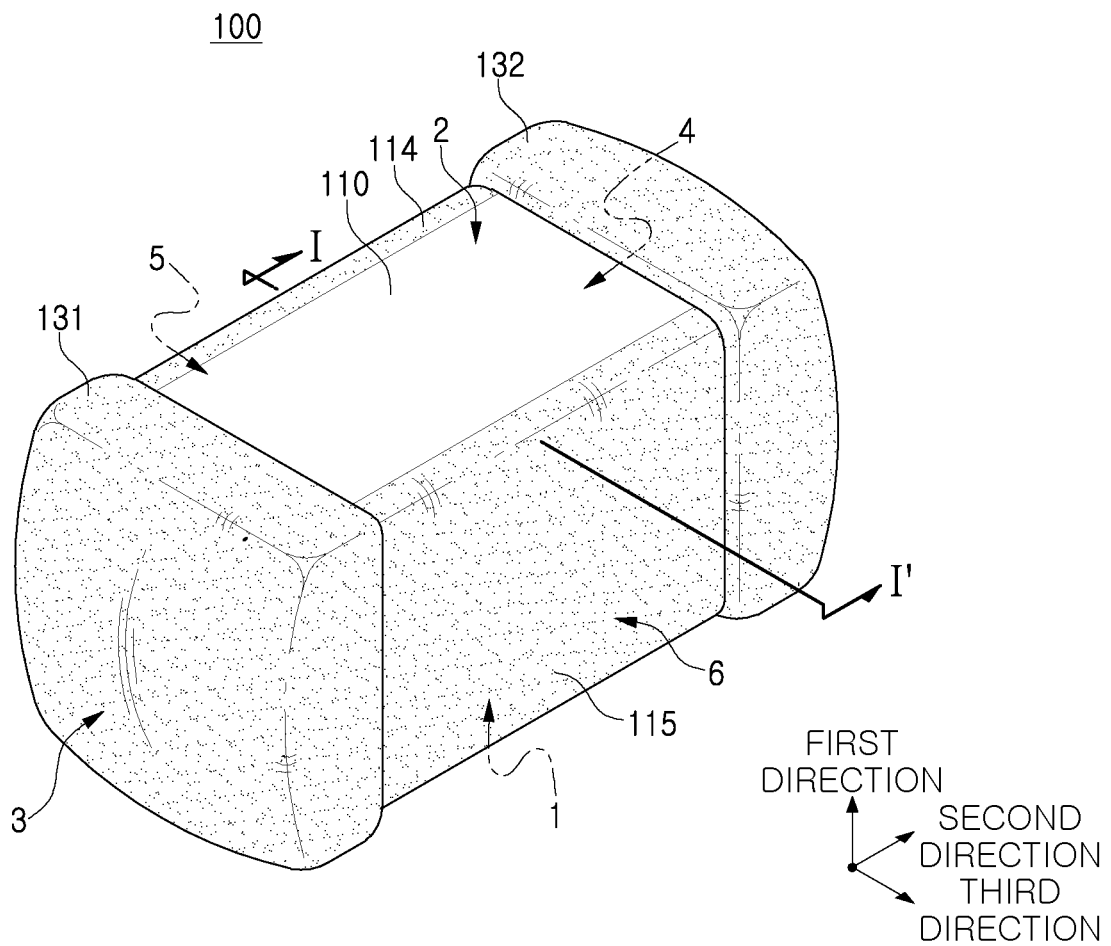
FIG. 1 is a schematic perspective view of a multilayer electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawing, a first direction may be defined as a stacking direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an example embodiment of the present disclosure.

Figure 2:
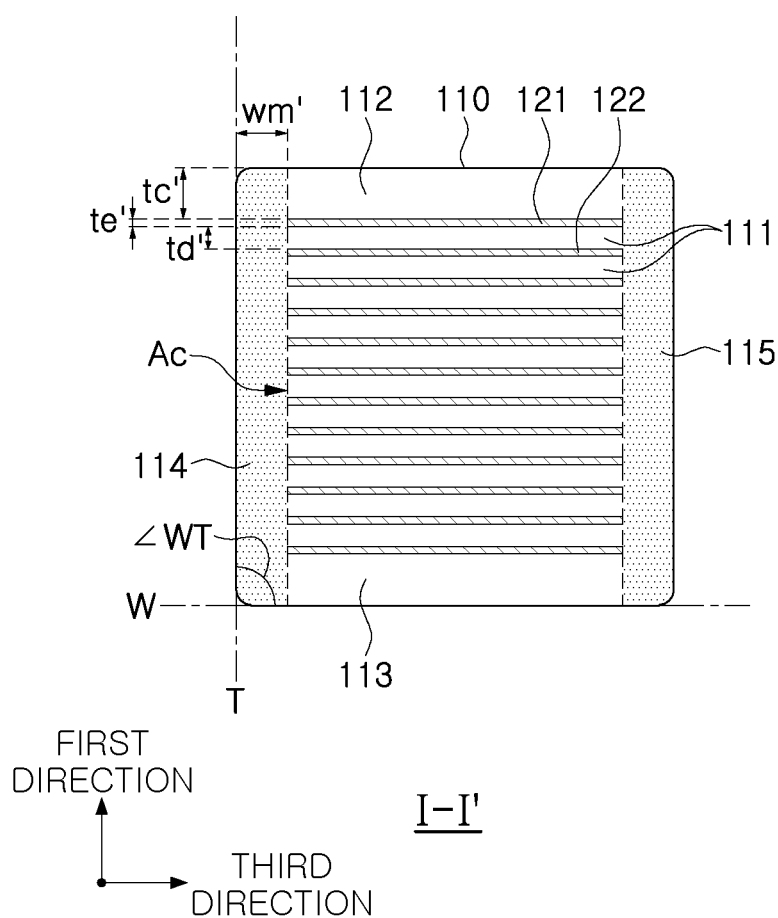
FIG. 2 is a schematic a cross-sectional view I-I' of FIG. 1.

FIG. 2 is a schematic a cross-sectional view I-I' of FIG. 1.

Hereinafter, a multilayer electronic component according to an example embodiment of the present disclosure will be described in detail with reference to FIGS. 1 and 2. However, although a multilayer ceramic capacitor is described as an example of a multilayer electronic component, the present disclosure may be applied to various electronic products using a dielectric composition, such as inductors, piezoelectric elements, varistors, thermistors, or the like.

A multilayer electronic component 100 according to an example embodiment of the present disclosure may a body 110 including an active portion Ac having capacitance formed by including a dielectric layer 111 and first and second internal electrodes 121 and 122 alternately disposed in a first direction with the dielectric layer 111 interposed therebetween, the body 110 having first and second surfaces 1 and 2 opposing each other in the first direction, third and fourth surfaces 3 and 4 connected to the first and second surfaces and opposing each other in a second direction, and fifth and sixth surfaces 5 and 6 connected to the first to fourth surfaces 1, 2, 3, and 4 and opposing each other in a third direction, first and second external electrodes 131 and 132 disposed on the outside of the body 110 in the second direction to be connected to the first and second internal electrodes 121 and 122, respectively, and margin portions 114 and 115 disposed on both end surfaces of the active portion Ac in the third direction. ∠WT may satisfy 90.0°±0.5°, where among outermost edges of cross-sections of the body 110 in the first and third directions, an extension line of an edge in the first direction is defined as T, an extension line of an edge in the third direction is defined as W, and an angle defined by T and W is defined as ∠WT.

In the body 110, a dielectric layer 111 and internal electrodes 121 and 122 may be alternately stacked.

More specifically, the body 110 may include an active portion Ac having capacitance formed by including the first internal electrode 121 and the second internal electrode 122 alternately disposed with the dielectric layer 111 interposed therebetween.

A specific shape of the body 110 is not particularly limited. However, as illustrated, the body 110 may have a hexahedral shape or a shape similar thereto. During a sintering process, ceramic powder included in the body 110 may be shrunken, such that the body 110 may not have a perfectly straight hexahedral shape, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

A plurality of dielectric layers 111 included in the body 110 may be in a sintered state, and adjacent dielectric layers 111 may be integrated with each other such that boundaries therebetween are not readily apparent without using a scanning electron microscope (SEM).

A raw material included in the dielectric layer 111 is not limited as long as sufficient capacitance is obtainable therewith. In general, a perovskite ($ABO_3$)-based material may be used. For example, a barium titanate-based material, a lead composite perovskite-based material, or a strontium titanate-based material may be used. The barium titanate-based material may include $BaTiO_3$-based ceramic powder. Examples of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) obtained by partially dissolving Ca or Zr in $BaTiO_3$.

In addition, as raw materials included in the dielectric layer 111, various ceramic additives, organic solvents, binders, and dispersants may be added to powder particles such as barium titanate ($BaTiO_3$), depending on the purpose of the present disclosure.

A thickness td' of each of the internal electrodes 121 and 122 is not particularly limited.

However, in order to more easily achieve miniaturization and implement high capacitance of the multilayer electronic component, the thickness td' of each of the internal electrodes 121 and 122 may be 0.6 µm or less, and more preferably 0.4 µm or less.

Here, a thickness td' of the dielectric layer 111 may refer to a thickness td' of the dielectric layer 111 interposed between the first and second internal electrodes 121 and 122.

The thickness td' of the dielectric layer 111 may refer to a size of the dielectric layer 111 in the first direction. In addition, the thickness td' of the dielectric layer 111 may refer to an average thickness td' of the dielectric layer 111, and may refer to an average size of the dielectric layer 111 in the first direction.

The average size of the dielectric layer 111 in the first direction may be measured by scanning, with an SEM, cross-sections of the body 110 in the first and second directions at a magnification of 10,000. More specifically, the average size may be an average value of sizes of one dielectric layer 111 in the first direction, measured at thirty points equally spaced apart from each other in the second direction, in the scanned image. The thirty points equally spaced apart from each other may be designated in the active portion Ac. In addition, when such average value measurement is performed on ten dielectric layers 111, the average size of the dielectric layer 111 in the first direction may be further generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately disposed to oppose each other with the dielectric layer 111 included in the body 110 interposed therebetween, and may be exposed through the third and fourth surfaces 3 and 4 of the body 110, respectively.

More specifically, the first internal electrode 121 may be spaced apart from the fourth surface 4, and may be exposed through the third surface 3, and the second internal electrode 122 may be spaced apart from the third surface 3, and may be exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. In this case, the first and second internal electrodes 121 and 122 may be electrically isolated from each other by the dielectric layer 111 interposed therebetween.

When the margin portions 114 and 115 described below are attached, the first internal electrode 121 and the second internal electrode 122 may be exposed through the fifth surface and the sixth surface 6 of the body 110. That is, the first internal electrode 121 may be exposed through the fifth surface and the sixth surface 6, and the second internal electrode 122 may be exposed through the fifth surface 5 and the sixth surface 6.

The body 110 may be formed by alternately stacking a first ceramic green sheet on which the first internal electrode 121 is printed and a second ceramic green sheet on which the second internal electrode 122 is printed, and then performing sintering thereon. Such a configuration will be described in more detail with reference to a method of manufacturing a multilayer electronic component to be described below.

A material included in the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing an internal electrode conductive paste including at least one of nickel (Ni), copper (Cu), palladium (Pd), silver (Ag), gold (Au), platinum (Pt), tin (Sn), tungsten (W), titanium (Ti), or alloys thereof, on a ceramic green sheet. A screen-printing method or a gravure-printing method may be used as a method for printing the internal electrode conductive paste, but the present disclosure is not limited thereto.

A thickness te' of each of the internal electrodes 121 and 122 is not particularly limited.

However, in order to more easily achieve miniaturization and implement high capacitance of the multilayer electronic component, the thickness of each of the internal electrodes 121 and 122 may be 0.6 µm or less, and more preferably 0.4 µm or less.

Here, the thickness te' of each of the internal electrodes 121 and 122 may refer to a size of each of the internal electrodes 121 and 122 in the first direction. In addition, the thickness te' of each of the internal electrodes 121 and 122 may refer to an average thickness te' of each of the internal electrodes 121 and 122, and may refer to an average size of each of the internal electrodes 121 and 122 in the first direction.

The average size of each of the internal electrodes 121 and 122 in the first direction may be measured by scanning, with an SEM, an image of the cross-sections of the body 110 in the first and second directions at a magnification of 10,000. More specifically, the average size may be an average value of sizes of each of one internal electrode 121 or 122 in the first direction, measured at thirty points equally spaced apart from each other in the second direction, in the scanned image. The thirty points equally spaced apart from each other may be designated in the active portion Ac. In addition, when an internal electrode on which such average value measurement is performed is extended to ten internal electrodes, the average size of each of the internal electrodes 121 and 122 in the first direction may be further generalized.

The body 110 may include cover portions 112 and 113 disposed on both end surfaces of the active portion Ac in the first direction.

More specifically, the body 110 may include an upper cover portion 112 disposed on an upper portion of the active portion Ac in the first direction, and a lower cover portion 113 disposed on a lower portion of the active portion Ac in the first direction.

The upper cover portion 112 and the lower cover portion 113 may be formed by stacking a single dielectric layer 111 or two or more dielectric layers 111 in the first direction in upper and lower surfaces of the active portion Ac, respectively, and may basically serve to prevent damage to the internal electrodes 121 and 122 caused by physical or chemical stress.

The upper cover portion 112 and the lower cover portion 113 may not include the internal electrodes 121 and 122, and may include a material the same as that of the dielectric layer 111. That is, the upper cover portion 112 and the lower cover portion 113 may include a ceramic material, for example, a barium titanate ($BaTiO_3$)-based ceramic material.

A thickness tc' of each of the cover portions 112 and 113 is not particularly limited.

However, in order to more easily achieve miniaturization and implement of high capacitance of the multilayer electronic component, the thickness tc' of each of the cover portions 112 and 113 may be 100 µm or less, preferably 30 µm or less, and more preferably 20 µm or less in ultra-small products.

Here, the thickness tc' of each of the cover portions 112 and 113 may refer to a size of each of the cover portions 112 and 113 in the first direction. In addition, the thickness tc' of each of the cover portions 112 and 113 may refer to an average thickness tc' of each of the cover portions 112 and 113, and may refer to an average size of each of the cover portions 112 and 113 in the first direction.

The average size of each of the cover portions 112 and 113 in the first direction may be measured by scanning, with an SEM, an image of the cross-sections of the body 110 in the first and second directions at a magnification of 10,000. More specifically, the average size may be an average value of sizes of one cover portion 112 or 113 in the first direction, measured at thirty points equally spaced apart from each other in the third direction, in the scanned image. The thirty points equally spaced apart from each other may be designated in the upper cover portion 112.

Although not illustrated in the drawings, the margin portions 114 and 115 may be disposed on both end surfaces of the body 110 in the third direction.

More specifically, the margin portions 114 and 115 may include a first margin portion 114 disposed on the fifth surface of the body 110 and a second margin portion 115 disposed on the sixth surface 6 of the body 110. That is, margin portions 114 and 115 may be disposed on the both end surfaces of the body 110 in the third direction.

Alternatively, as illustrated, the margin portions 114 and 115 may refer to a region between both ends of the first and second internal electrodes 121 and 122 exposed in the third direction and a boundary surface of the body 110, with respect to cross-sections of the body 110 cut in the second and third directions.

The margin portions 114 and 115 may basically serve to prevent damage to the internal electrodes 121 and 122 caused by physical or chemical stress.

In order to suppress a step caused by the internal electrodes 121 and 122, the internal electrodes 121 and 122 may be stacked and cut to be exposed through the fifth and sixth surfaces 5 and 6 of the body 110, and then a single dielectric layer 111 or two or more dielectric layers 111 may be stacked on both end surfaces of the active portion Ac in the third direction to form the margin portions 114 and 115.

That is, the internal electrodes 121 and 122 and the dielectric layer 111 may be simultaneously cut and formed, and the size of the internal electrodes 121 and 122 in the third direction and the size of the dielectric layer 111 in the third direction may be formed to be the same. More details regarding such a configuration will be described below.

A width wm' of each of the first and second margin portions 114 and 115 is not particularly limited.

However, in order to more easily achieve miniaturization and implement high capacitance of the multilayer electronic component 100, the width wm' of each of the first and second margin portions 114 and 115 may be 100 μm or less, preferably 30 μm or less, and more preferably 20 μm or less in ultra-small products.

Here, the width wm' of each of the margin portions 114 and 115 may refer to a size of each of the margin portions 114 and 115 in the third direction. In addition, the width of each of the margin portions 114 and 115 may refer to an average width of each of the margin portions 114 and 115, and may refer to an average size of each of the margin portions 114 and 115 in the third direction.

The average size of each of the margin portions 114 and 115 in the third direction may be measured by scanning, with an SEM, an image of cross-sections of the body 110 in the first and third directions at a magnification of 10,000. More specifically, the average size may be an average value of sizes of one margin portion 114 or 115 in the third direction, measured at thirty points equally spaced apart from each other in the first direction, in the scanned image. The thirty points equally spaced apart from each other may be designated in the first margin portion 114.

The multilayer electronic component 100 including the margin portions 114 and 115 attached by a manufacturing method according to another example embodiment of the present disclosure described below is described with reference to FIG. 2. ∠WT may satisfy 90.0°±0.5°, where among outermost edges of cross-sections of the body 110 in the first and third directions, an extension line of an edge in the first direction is defined as T, an extension line of an edge in the third direction is defined as W, and an angle defined by T and W is defined as ∠WT.

Such a configuration may mean that a multilayer electronic component is not deformed due to slipping of a margin portion green sheet, which may occur when the margin portion green sheet is attached, or external force or stress that may occur in the process of forming a margin portion. More details regarding a method of manufacturing the margin portion will be described below.

In an example embodiment of the present disclosure, a structure in which a ceramic electronic component 100 has two external electrodes 131 and 132 is described, but the number or shape of the external electrodes 131 and 132 may vary depending on the shape or other purposes of the internal electrodes 121 and 122.

The external electrodes 131 and 132 may be disposed on the body 110 to be connected to the internal electrodes 121 and 122.

More specifically, the external electrodes 131 and 132 may include the first and second external electrodes 131 and 132 disposed on the third and fourth surfaces 3 and 4 of the body 110 and connected to the first and second internal electrodes 121 and 122, respectively. That is, the first external electrode 131 may be disposed on the third surface 3 of the body 110 to be connected to the first internal electrode 121, and the second external electrode 132 may be disposed on the fourth surface 4 of the body 110 to be connected to the second internal electrode 122.

The external electrodes 131 and 132 may be formed using any material as long as it has electrical conductivity, such as metal, and a specific material may be determined in consideration of electrical properties, structural stability, and the like. Furthermore, the external electrodes 131 and 132 may have a multilayer structure.

For example, the external electrodes 131 and 132 may include an electrode layer disposed on the body 110 and a plating layer disposed on the electrode layer.

As a more specific example of the electrode layer, the electrode layer may be a sintered electrode including a conductive metal and glass, or a resin-based electrode including a conductive metal and resin.

In addition, the electrode layer may have a form in which the sintered electrode and the resin-based electrode are sequentially formed on the body 110.

In addition, the electrode layer may be formed by transferring a sheet including a conductive metal onto the body by transferring a sheet including a conductive metal onto the sintered electrode.

The conductive metal used in the electrode layer is not particularly limited as long as it may be electrically connected to an internal electrode to form capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof. The electrode layer may be formed by applying a conductive paste prepared by adding a glass frit to the conductive metal powder and then sintering the conductive paste.

The plating layer may serve to improve mounting properties.

A type of the plating layer is not particularly limited, and may be a single plating layer including at least one of nickel (Ni), tin (Sn), palladium (Pd), or alloys thereof, and may be formed as a plurality of plating layers.

As a more specific example of the plating layer, the plating layer may be a Ni plating layer or a Sn plating layer, may have a form in which a Ni plating layer and a Sn plating layer are sequentially formed on the electrode layer, and may have a form in which a Sn plating layer, a Ni plating layer, and a Sn plating layer are sequentially formed. In addition, the plating layer may include a plurality of Ni plating layers and/or a plurality of Sn plating layers.

Method of Manufacturing Multilayer Electronic Component

FIGS. 3A through 3I are cross-sectional views and perspective views schematically illustrating a method of manufacturing a multilayer electronic component according to another example embodiment of the present disclosure.

Hereinafter, a method of manufacturing a multilayer electronic component according to another example embodiment of the present disclosure will be described in detail with reference to FIG. 3. However, contents overlapping those of the above-described multilayer electronic component will be omitted.

A method of manufacturing a multilayer electronic component according to another example embodiment, the method may include preparing a first ceramic green sheet 211 on which a plurality of first internal electrode patterns 221 are formed at predetermined intervals and a second ceramic green sheet 211 on which a plurality of second internal electrode patterns 222 are formed at predetermined intervals, forming a ceramic green sheet stacked body 210 by alternately stacking the first ceramic green sheet 211 and the second ceramic green sheet 211 in a first direction such that the first internal electrode pattern 221 and the second internal electrode pattern 222 overlap each other, cutting the ceramic green sheet stacked body 210 such that ends of the first and second internal electrode patterns 221 and 222 are exposed in a third direction, when a direction in which the first and second internal electrode patterns 221 and 222 have a larger size is defined as a second direction and a direction in which the first and second internal electrode patterns 221 and 222 have a smaller size is defined as the third direction, disposing, on an elastic pad 310 to which an adhesive 320 is attached, a plurality of cut ceramic green sheet stacked bodies 210 to be spaced apart from each other, attaching margin portion green sheets 214 and 215 including a ceramic material, a photocuring agent, and a photoinitiator to at least one end surface of each of the plurality of cut ceramic green sheet stacked bodies in the third direction, an energy irradiation operation of irradiating, with energy 610, the margin portion green sheets 214 and 215 to generate a photocuring polymerization reaction between the photocuring agent and the photoinitiator, and preparing a body 110 including a dielectric layer 111, a first internal electrode 121, and a second internal electrode 122 and margin portions 114 and 115 by sintering the cut ceramic green sheet stacked body 210 to which the margin portion green sheets 214 and 215 are attached.

Figure 3A:
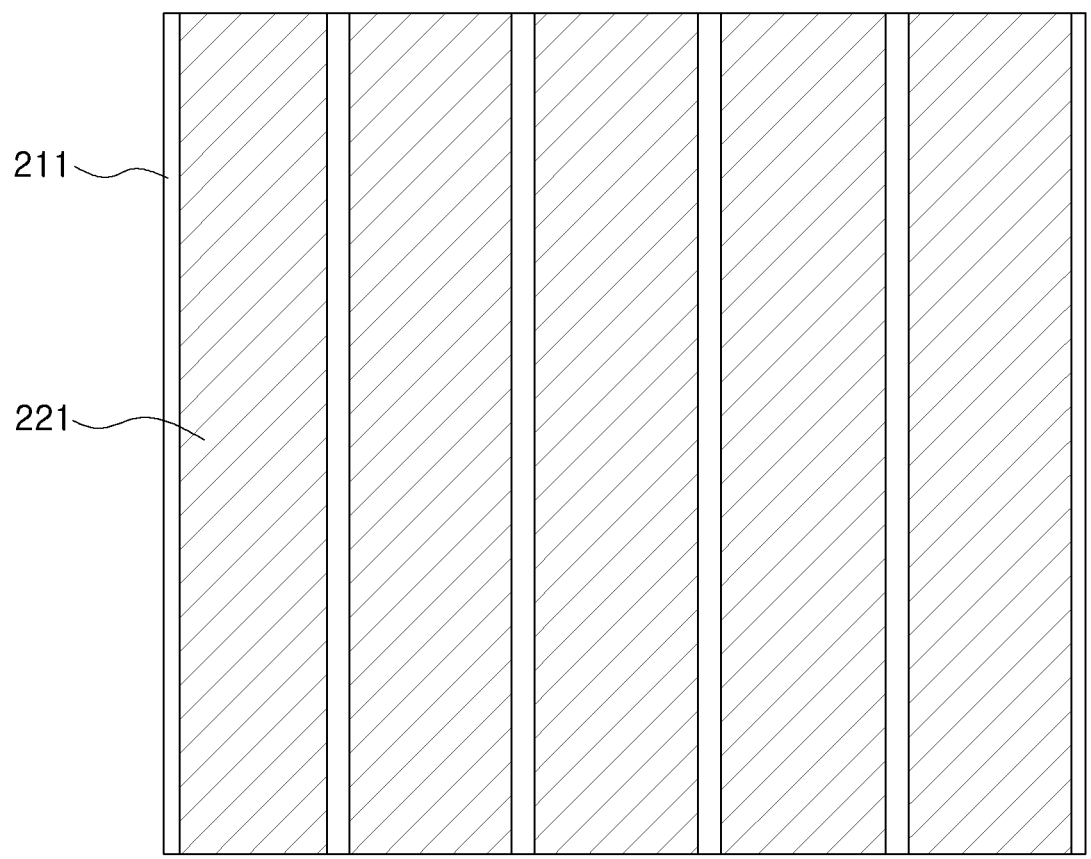
FIGS. 3A, 3B, 3C, 3D, 3E, 3F, 3G, 3H, and 3I are cross-sectional views and perspective views schematically illustrating a method of manufacturing a multilayer electronic component according to another example embodiment of the present disclosure.

As illustrated in FIG. 3A, a plurality of stripe-shaped first internal electrode patterns 221 may be formed on the ceramic green sheet 211 at predetermined intervals. The plurality of stripe-shaped first internal electrode patterns 221 may be formed to be parallel to each other, and a ceramic green sheet on which the first internal electrode pattern 221 is formed may be defined as a first ceramic green sheet.

The ceramic green sheet 211 may include a ceramic slurry including a ceramic material, an organic solvent, and an organic binder. The ceramic material, a material having high permittivity, is not particularly limited. As the ceramic material, a perovskite ($ABO_3$)-based material, for example, a barium titanate-based material, a lead composite perovskite-based material, or a strontium titanate-based material, may be used. The barium titanate-based material may include $BaTiO_3$-based ceramic powder. Examples of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) obtained by partially dissolving Ca or Zr in $BaTiO_3$.

The stripe-shaped first internal electrode pattern 221 may be formed of an internal electrode paste including a conductive metal, and the conductive metal is not particularly limited. However, the stripe-shaped first internal electrode pattern 221 may have excellent electrical conductivity in the same manner as the above-described internal electrodes 121 and 122.

The first internal electrode pattern 221 may be formed on a first ceramic green sheet 221a by a screen-printing method or a gravure-printing method, but the present disclosure is not limited thereto.

In addition, although not illustrated, a plurality of stripe-shaped second internal electrode patterns 222 may be formed on another ceramic green sheet 211 at predetermined intervals, and a ceramic green sheet on which the second internal electrode pattern 222 is formed may be defined as a second ceramic green sheet.

Figure 3B:
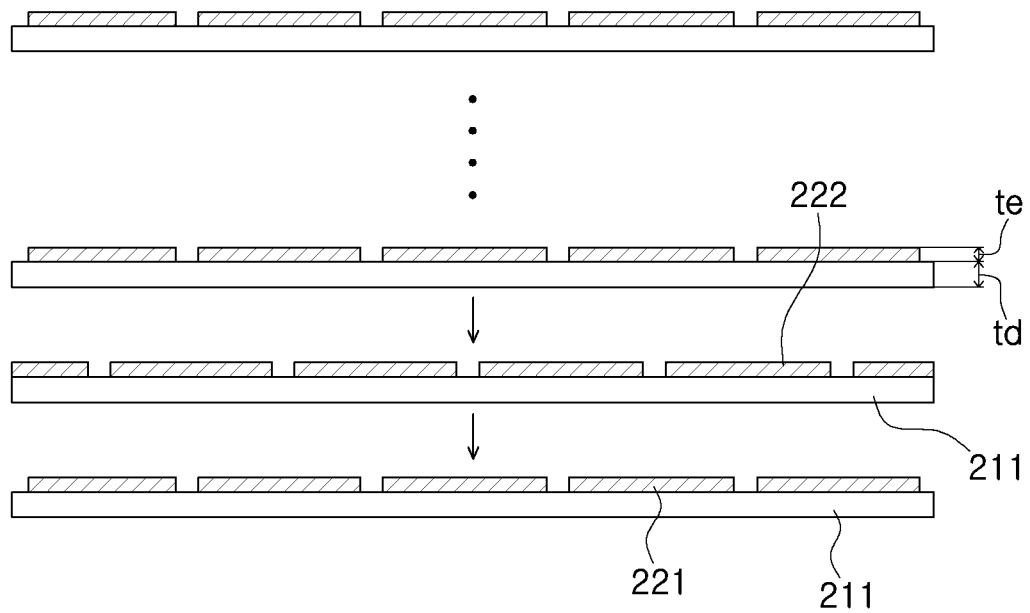

Subsequently, as illustrated in FIG. 3B, the first and second ceramic green sheets may be alternately stacked such that the stripe-shaped first internal electrode pattern 221 and the stripe-shaped second internal electrode pattern 222 are alternately stacked.

In this case, a portion in which capacitance is formed by stacking the ceramic green sheet 211 and the internal electrode patterns 221 and 222 in the first direction may be defined as a green active portion, and cover portion green sheets 212 and 213 may be disposed on both end surfaces of the green active portion in the first direction. More specifically, the cover portion green sheets 212 and 213 may include a first cover portion green sheet 212 disposed on an upper portion of the green active portion in the first direction, and a second cover portion green sheet 213 disposed on a lower portion of the green active portion in the first direction.

Thereafter, the stripe-shaped first internal electrode pattern 221 may become the first internal electrode 121, and the stripe-shaped second internal electrode pattern 222 may become the second internal electrode 122. In addition, the first cover portion green sheet 212 may become the first cover portion 112, and the second cover portion green sheet 213 may become the second cover portion 113.

A thicknesses td of each of the first and second ceramic green sheets is not particularly limited.

However, in order to more easily achieve miniaturization and implement high capacitance of the multilayer electronic component, the thickness td of each of the first and second ceramic green sheets may be 1.0 μm or less, preferably 0.6 μm or less, and more preferably 0.4 μm or less.

Here, the thicknesses td of each of the first and second ceramic green sheets may refer to a size of each of the first and second ceramic green sheets in the first direction.

A thickness te of each of the first and second internal electrode patterns is not particularly limited.

However, in order to more easily achieve miniaturization and implement high capacitance of the multilayer electronic component, the thickness te of each of the first and second internal electrode patterns may be 1.0 μm or less, preferably 0.6 μm or less, and more preferably 0.4 μm or less.

Figure 3C:
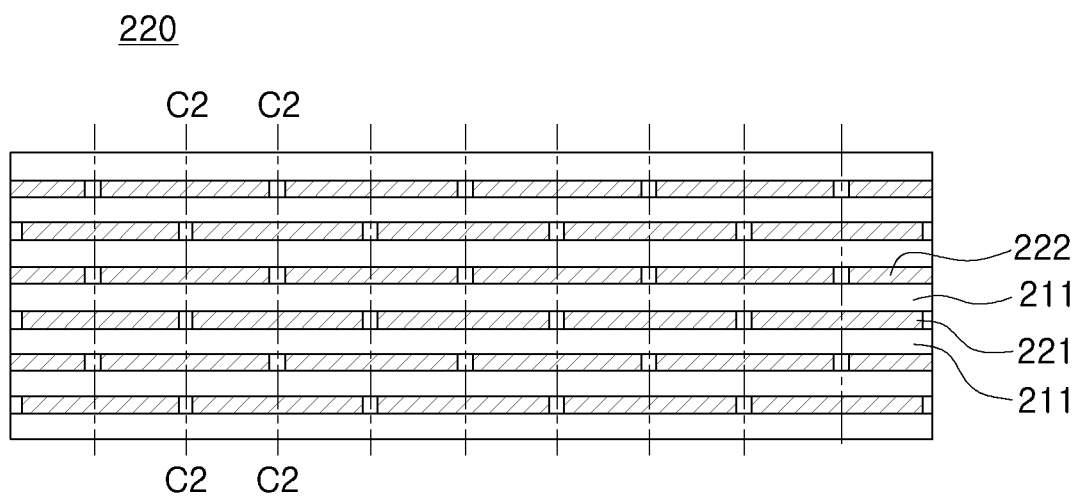
Figure 3D:
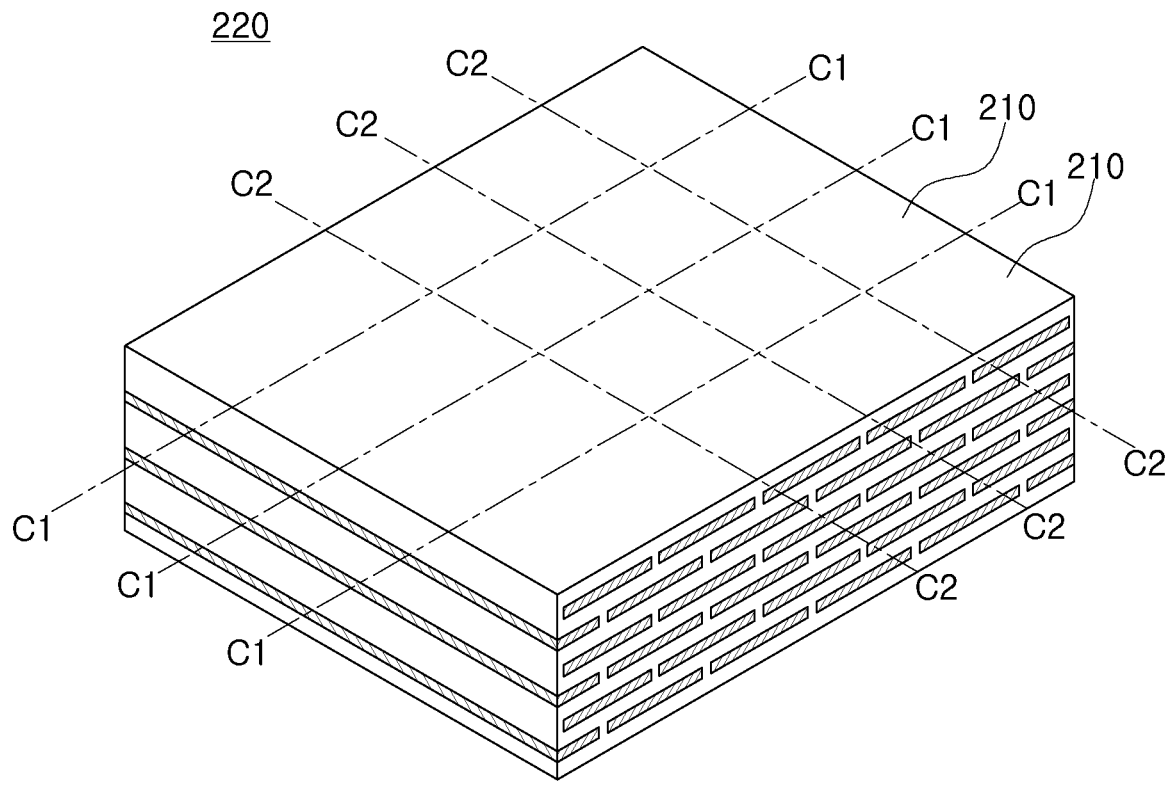

FIG. 3C is a cross-sectional view of the ceramic green sheet stacked body 220 in which first and second ceramic green sheets are stacked in a first direction, and FIG. 3D is a schematic perspective view of the ceramic green sheet stacked body 220 in which first and second ceramic green sheets are stacked.

Referring to FIGS. 3C and 3D, a first ceramic green sheet on which a plurality of parallel stripe-shaped first internal electrode patterns 221 are printed and a second ceramic green sheet on which a plurality of parallel stripe-shaped second internal electrode patterns 222 are printed may be stacked alternately with each other.

More specifically, the first ceramic green sheet and the second ceramic green sheet may be stacked such that a central portion of the stripe-shaped first internal electrode pattern 221 printed on the first ceramic green sheet and an interval between the stripe-shaped second internal electrode patterns 222 printed on the second ceramic green sheet overlap each other.

Subsequently, as illustrated in FIG. 3D, the ceramic green sheet stacked body 220 may be cut to traverse the plurality of stripe-shaped first internal electrode patterns 221 and stripe-shaped second internal electrode patterns 222. That is, the ceramic green sheet stacked body 210 may be a ceramic green sheet stacked body 210 cut along cutting lines C1-C1 and C2-C2 orthogonal to each other.

More specifically, the stripe-shaped first internal electrode pattern 221 and the stripe-shaped second internal electrode pattern 222 may be cut in the second direction to be divided into a plurality of internal electrodes having a constant size in the third direction. In this case, the stacked ceramic green sheets may also be cut into a plurality of pieces together with the internal electrode patterns to prepare a plurality of cut ceramic green sheet stacked bodies 210. The sizes of the cut ceramic green sheet and the cut internal electrode pattern in the third direction may be the same.

In addition, the ceramic green sheet stacked body 210 may cut according to individual body sizes along cutting line C2-C2. That is, before margin portion green sheets 214a and 214b are attached, the bar-shaped ceramic green sheet stacked body 210 may be cut into individual ceramic body sizes along cutting line C2-C2 to form the plurality of cut ceramic green sheet stacked bodies 210.

That is, the bar-shaped ceramic green sheet stacked body 210 may be cut such that a central portion of the first internal electrode and a predetermined interval formed between the second internal electrodes, overlapping each other, are cut by the same cutting line. Accordingly, ends of the first internal electrode and the second internal electrode may be alternately exposed to a cut surface.

Figure 3E:
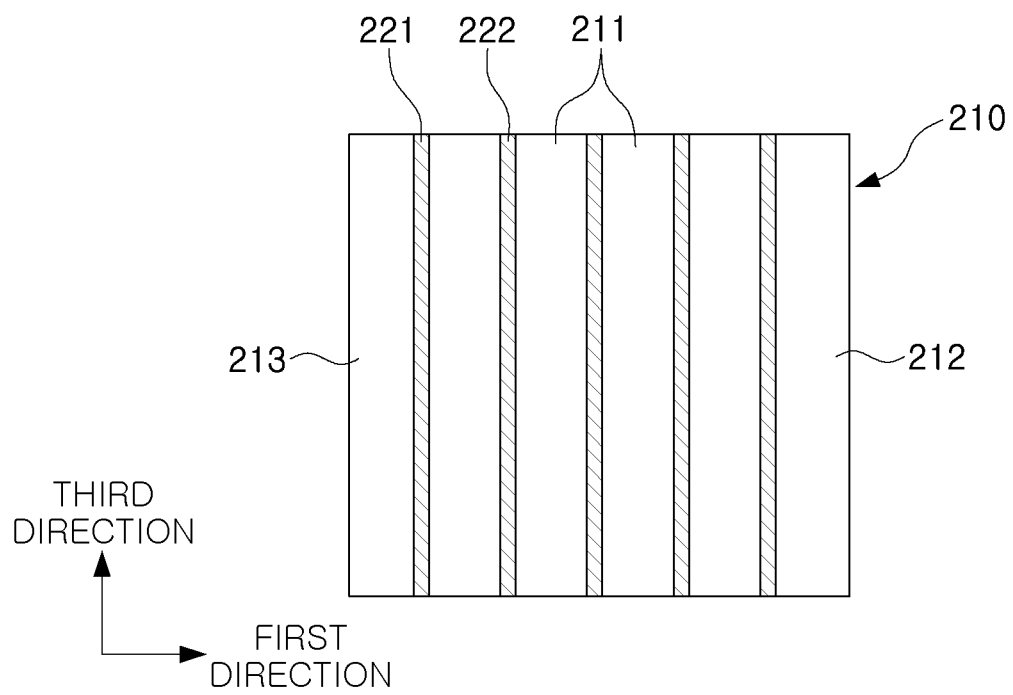

Thereafter, as illustrated in FIG. 3E, the cut ceramic green sheet stacked body 210 may be prepared.

In order to realize miniaturization and implement high capacitance of the multilayer ceramic capacitor, an internal electrode may be exposed in a width direction of a body, thereby maximizing an area of the internal electrode in the width direction through a design without margin. After such a chip is manufactured, a method of completing the multilayer ceramic capacitor by separately attaching a margin portion to an exposed surface of an electrode in the width direction of the chip has been applied before sintering.

In a method of forming a margin portion according to the related art, a process of attaching a margin portion green sheet to the multilayer electronic component, applying heat and pressure to the margin portion green sheet to compress the margin portion green sheet and attach the margin portion green sheet to the multilayer electronic component, and punching a portion of the margin portion green sheet that is not attached to the multilayer electronic component to remove a remaining marginal green sheet may be performed to attach the margin portion to a cut surface of the multilayer electronic component in the width direction.

However, high heat, pressure, and punching processes required in the process of attaching the margin portion may cause deformation of the multilayer electronic component, thereby increasing a defect rate. In addition, a process of forming a margin portion according to the related art may be not only cumbersome, but also may have a disadvantage in that the multilayer electronic component is exposed to high stress. The high stress applied to the multilayer electronic component may causes defects such as deformation of the multilayer electronic component and slipping of a margin portion sheet, thereby degrading completeness or degrading production yield.

The method of manufacturing a multilayer electronic component according to an example embodiment of the present disclosure may simplify a process of attaching a margin portion sheet and a punching process of cutting the margin portion sheet according to a size of the multilayer electronic component into one process, and may minimize stress applicable to the multilayer electronic component. Hereinafter, the manufacturing method of the present disclosure will be described in more detail.

Figure 3F:
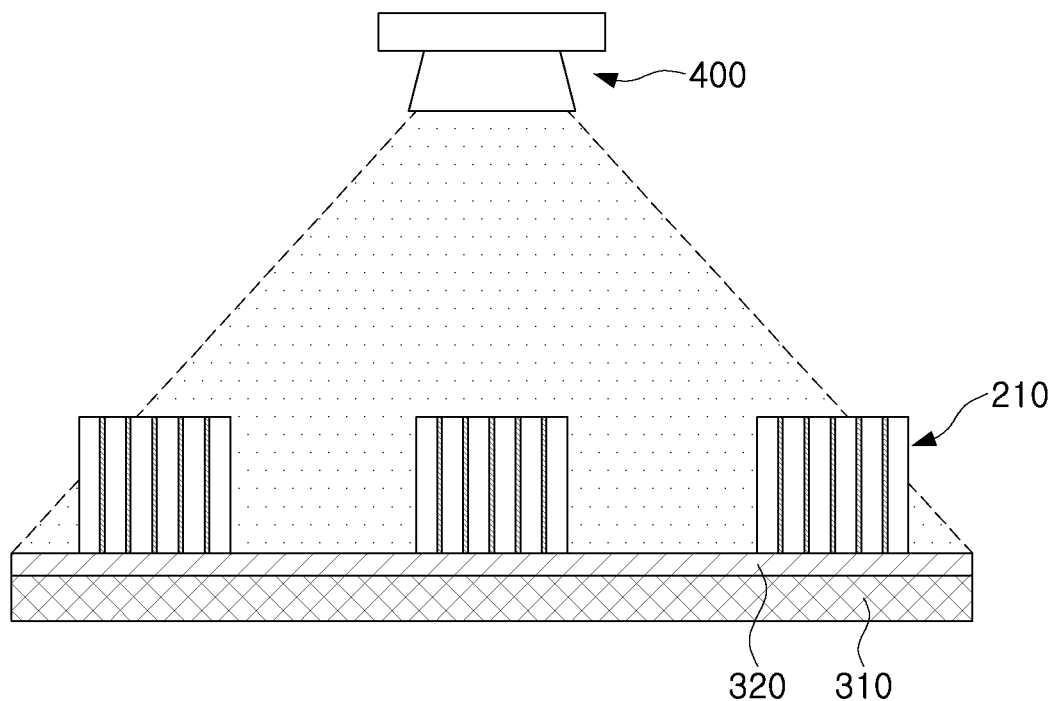

As illustrated in FIG. 3F, the method of manufacturing a multilayer electronic component according to an example embodiment of the present disclosure may include an operation of disposing, on an elastic pad 320 to which an adhesive 310 is attached, the plurality of cut ceramic green sheet stacked bodies 210 to be spaced apart from each other, after an operation of forming the plurality of cut ceramic green sheet stacked bodies 210.

In this case, a distance between the plurality of cut ceramic green sheet stacked bodies 210 is not particularly limited, but a constant distance may be preferably maintained. When the distance between the plurality of cut ceramic green sheet stacked bodies 210 is the same as or larger than a size of the cut ceramic green sheet stacked body 210 in the first direction, the margin portion green sheet may be easily attached.

In this case, the method may include an operation of scanning the plurality of cut ceramic green sheet stacked bodies 210 spaced apart from each other. In this case, a type of a scanner 400 performing the scanning operation is not particularly limited, but, for example, a three-dimensional (3D) laser scanner may be used.

Here, the 3D laser scanner may refer to a non-contact scanner irradiating an object to be scanned with light from a laser or lamp and detecting the reflected light to determine a shape of the object. The 3D laser scanner may be used to obtain shapes of the plurality of cut ceramic green sheet stacked bodies 210 disposed to be spaced apart from each other, and arrangement data.

Figure 3G:
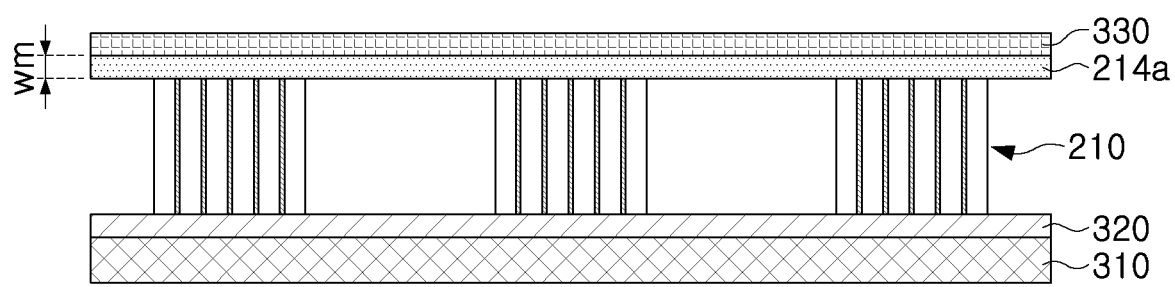

Subsequently, as illustrated in FIG. 3G, the method may include an operation of attaching margin portion green sheets 214a and 215a to at least one end surface of each of the plurality of cut ceramic green sheet stacked bodies 210 in the third direction.

In this case, the margin portion green sheets 214a and 215a may be movable while being attached to a carrier film, and may be attached to the at least one end surface of each of the plurality of cut ceramic green sheet stacked bodies 210 in the third direction without heating or pressing.

The margin portion green sheets 214a and 215a may include a ceramic slurry including a ceramic material, an organic solvent, and an organic binder. The ceramic material, a material having high permittivity, is not particularly limited. As the ceramic material, a perovskite ($ABO_3$)-based material, for example, a barium titanate-based material, a lead composite perovskite-based material, or a strontium titanate-based material, may be used. The barium titanate-based material may include $BaTiO_3$-based ceramic powder. Examples of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) obtained by partially dissolving Ca or Zr in $BaTiO_3$.

In addition, the margin portion green sheets 214a and 215a may include a photocuring agent and a photoinitiator.

The photocuring agent may include, for example, at least one monomer or oligomer among epoxy, acrylate, urethane, and thiol, but the present disclosure is particularly limited thereto.

In this case, a content of the photocuring agent may be 15 wt % to 26 wt % relative to the ceramic material included in the margin portion green sheets 214a and 215a.

When the content of the photocuring agent is less than 15 wt % relative to the ceramic material, sufficient adhesive strength may not be obtained even when a photocuring polymerization reaction is completed. When the content of the photocuring agent is greater than 26 wt % relative to the ceramic material, an excessive content of an organic material may reduce the reliability of the multilayer electronic component 100 after sintering.

The photoinitiator may include, for example, at least one of benzoin methyl ether, 2,2-dimethoxy-2-phenylacetophenone, 2-hydroxy-2-methyl-phenyl-propane-1-one, α-hydroxy-acetophenone, bis(2,6-dimethoxybenzoyl)-2,4,4-trimethylpentylphosphine oxide, 2,4,6-trimethylbenzoyldiphenylphosphine oxide, or bis(2,6-dichlorobenzoyl)-(4-propylphenyl)-phosphine oxide, but the present disclosure is particularly limited thereto.

A content of the photoinitiator may be 0.1 wt % to 5.0 wt % relative to the content of the photocuring agent.

When the content of the photoinitiator is less than 0.1 wt % and greater than 5.0 wt % of the photocuring agent, a photocuring polymerization reaction described below may not be sufficiently performed, and the margin portions 114 and 115 may not have sufficient mechanical strength after sintering, thereby degrading the reliability of the multilayer electronic component 100.

Figure 3H:
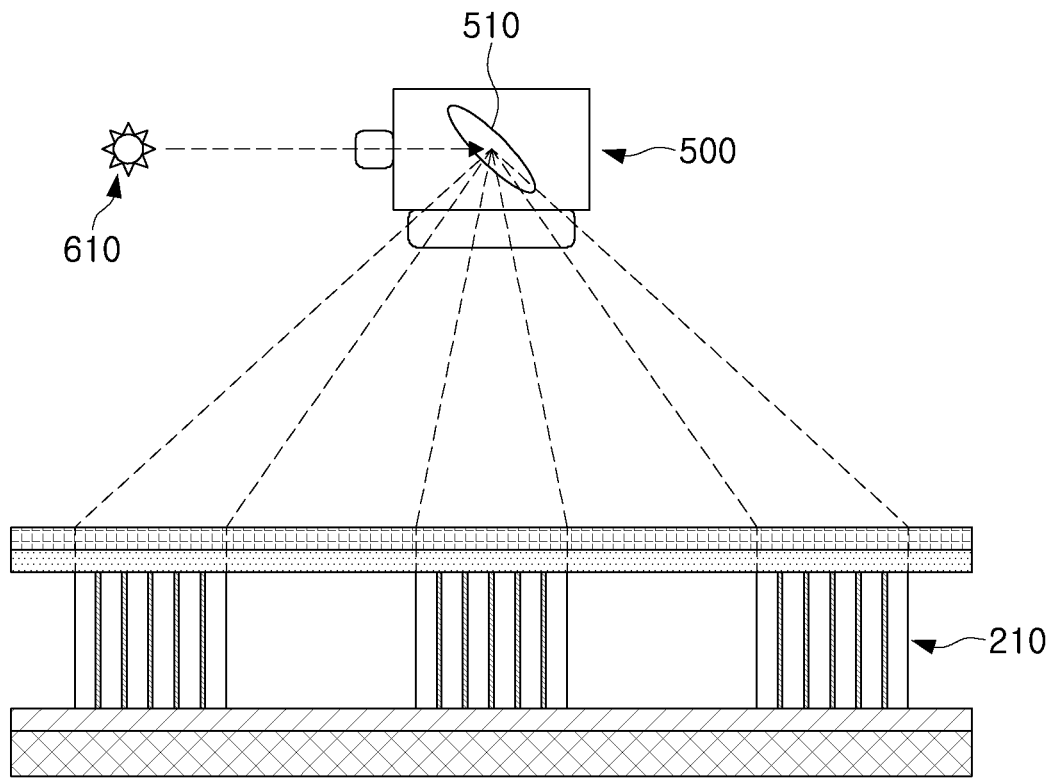
Figure 3I:
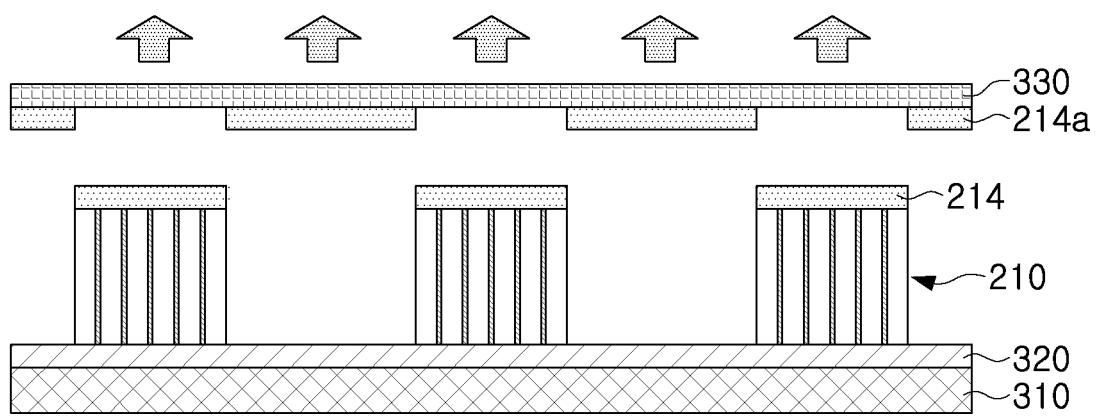

Subsequently, as illustrated in FIG. 3H, the method may include an energy irradiation operation of irradiating, with energy, the margin portion green sheets 214a and 215a to generate a photocuring polymerization reaction between the photocuring agent and the photoinitiator.

In this case, in the energy irradiation operation, only regions of the margin portion green sheets 214a and 215a, attached to the plurality of cut ceramic green sheet stacked bodies 210 disposed to be spaced apart from each other, may be irradiated with energy.

When a photocuring polymerization reaction is generated using the energy 610 irradiated from an energy irradiation device, on the margin portion green sheets 214a and 215a including the photocuring agent and the photoinitiator, the photocuring polymerization reaction may be generated within a short period of time, whereby a photocuring polymerization reactant may be generated. In this case, the margin portion green sheets 214 and 215 may include the photocuring polymerization reactant, thereby improving mechanical strength thereof.

In this case, the energy 610 may be, for example, light energy including ultraviolet (UV) having a wavelength of about 100 nm to 400 nm, and may be an electron beam (EB) having a wavelength of $10^{-3}$ nm to 10 nm, but the present disclosure is not limited thereto.

In a method of irradiating, with energy, only regions of the marginal portion green sheets 214a and 215a attached to the plurality of cut ceramic green sheet stacked bodies 210 disposed to be spaced apart from each other, an energy reflecting device, dispersing and selectively reflecting energy, may be used.

More specifically, for example, overall arrangement data of a shape of an individual multilayer electronic component acquired through the above-described non-contact scanner may be transmitted to a digital mirror device (DMD). In this case, in the DMD, tens to hundreds of thousands of micromirrors may be arranged depending on the resolution thereof, and an angle of each micromirror 510 may be individually adjusted. The angle of the micromirror 510 may be adjusted, and energy incident on the DMD may be partially reflected, based on transmitted image data. Accordingly, energy may be applied to the regions of the margin portion green sheets 214a and 215a to be irradiated. In this manner, the photocuring polymerization reaction may be selectively performed only on the regions of the margin portion green sheets 214a and 215a attached to at least one end surface of the multilayer electronic component in the third direction, such that the margin portion green sheets 214 and 215 on which the photocuring polymerization reaction is performed may be formed.

Subsequently, the method may include an operation of separating the carrier film 330 to which the margin portion green sheets 214a and 215a are attached from the cut ceramic green sheet stacked body 210.

In this case, the margin portion green sheets 214 and 215, selectively including the photocuring polymerization reactant, may be attached to the cut ceramic green sheet stacked body 210. As the carrier film 330 is separated, the margin portion green sheets 214a and 215a on which the photocuring polymerization reaction is not performed may be detached from the cut ceramic green sheet stacked body 210.

Figure 4:
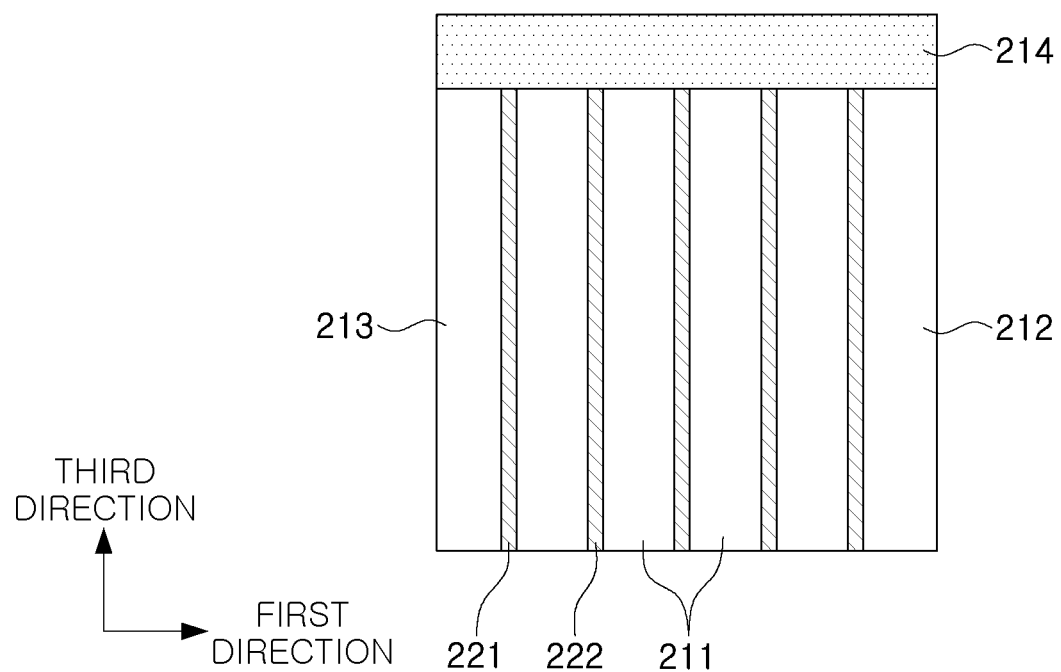
FIG. 4 is a schematic cross-sectional view in which a margin portion is attached to one surface of a body by a method of manufacturing a multilayer electronic component according to another example embodiment of the present disclosure.

Referring to FIG. 4 according to an example embodiment of the present disclosure, a first margin portion green sheet 214 on which the photocuring polymerization reaction is performed may be attached to one end surface of the cut ceramic green sheet stacked body 210.

Thereafter, the cut ceramic green sheet stacked body 210 to which the margin portion green sheet 214 on which the photocuring polymerization reaction is performed is not attached may be rotated such that a second margin portion green sheet 215a is attached to the other end surface of the cut ceramic green sheet stacked body 210, for example, the sixth surface 6. Thereafter, through the same process as the above-described operation, the second margin portion green sheet 215 including the photocuring polymerization reactant may be attached.

If necessary, the margin portion green sheet 214 may be attached to only one end surface of the cut ceramic green sheet stacked body 210 in the third direction, and the margin portion green sheets 214 and 215 may be attached to both end surfaces in the third direction, but the present disclosure is not limited thereto.

Referring to FIG. 2, which is similar to the present operation in terms of form, in the method of manufacturing a multilayer electronic component according to an example embodiment of the present disclosure, after the energy irradiation operation, $\angle WT$ may satisfy 90.0°±0.5°, where among outermost edges of cross-sections of the cut ceramic green sheet stacked body in the first and third directions, an extension line of an edge in the first direction is defined as T, an extension line of an edge in the third direction is defined as W, and an angle defined by T and W is defined as $\angle WT$.

This may be a result of the manufacturing method according to an example embodiment of the present disclosure, rather than the margin portion forming method according to the related of applying stress to a multilayer electronic component by pressing or heating.

More specifically, T may be an imaginary straight line connecting both end points of an edge of the body in the first direction, W may be an imaginary straight line connecting both end points of an edge of the body in the third direction, and $\angle WT$ may refer to an angle defined by T and W.

Subsequently, the method may include an operation of preparing a body including a dielectric layer, a first internal electrode, and a second internal electrode and a margin portion by sintering the cut ceramic green sheet stacked body 210 to which the margin portion green sheets 214 and 215 are attached.

During a sintering process performed in the operation of preparing the body and the margin portion, the photocuring polymerization reactant of the margin portion ceramic green sheets 214 and 215 on which the photocuring polymerization reaction is performed may be removed. Depending on heat treatment temperature, a portion of the photocuring polymerization reactant may remain. However, the photocuring polymerization reactant may not remain at a heat treatment temperature for securing sufficient mechanical strength of the margin portions 114 and 115.

Such a process may shorten a process of forming the margin portion, and an unnecessary process such as punching may not be performed, such that stress applied to the multilayer electronic component may be minimized to significantly reduce a defect rate, thereby improving the yield of a chip, a finished product.

The method of manufacturing a multilayer electronic component according to an example embodiment of the present disclosure may include applying first and second external electrode pastes to the outside of the body in the second direction, after the operation of preparing the body and the margin portion. In addition, the first external electrode 131 and the second external electrode 132 may be prepared by sintering the first and second external electrode pastes.

The external electrodes 131 and 132 may be the same as those described above, and thus a repeated description will be omitted.

In addition, the method may include an operation of forming a first plating layer on the first external electrode and an operation of forming a second plating layer on the second external electrode, after the operation of preparing the first external electrode and the second external electrode.

A plating layer may the same as that described above, and thus a repeated description will be omitted.

While example embodiments have been illustrated and described above, it will be apparent to those skilled in the art that modifications and variations could be made without departing from the scope of the present disclosure as defined by the appended claims.

Hereinafter, the present disclosure will be described in more detail through experimental examples. The experimental examples are provided to assist in understanding of the disclosure, and thus the present disclosure is not limited by the examples.

Experimental Examples

Tables 1 to 3 below provide relevant data indicating a comparison between numerical values before and after a transfer process in Comparative Example in which a margin portion was formed by a method of manufacturing a margin portion according to the related art and Example in which a margin portion was formed by a method of manufacturing a margin portion according to an example embodiment of the present disclosure.

In the transfer process in Comparative Example, a green sheet for a side margin portion was attached to a side surface of a cut ceramic green sheet stacked body on which ends of the first internal electrode and the second internal electrode are exposed in a width direction by applying heat and pressure with an elastic body, and the side margin portion green sheet was cut to have a shape the same as a shape of the stacked body by applying pressure again with another elastic body, thereby completing the formation of a side margin portion.

In the transfer process in Example, a green sheet for a side margin portion including a photocurable material was attached to a side surface of a stacked body in a width direction by selectively irradiating a region in which the stacked body and the side margin sheet overlap each other with light in a wavelength range capable of inducing a photopolymerization reaction by reacting with the photocurable material, and a remaining portion was removed along with removal of a carrier film, thereby completing the formation of a side margin portion.

Table 1 shows data obtained by measuring a size of T before and after the transfer process in Comparative Example and Example, Table 2 shows data obtained by measuring a size of W before and after the transfer process in Comparative Example and Example, and Table 3 shows data obtained by measuring a size of $\angle WT$ before and after the transfer process in Comparative Example and Example.

A chip, a multilayer electronic component, was observed using an optical microscope (OM) from Olympus Korea Company, and the chip was observed under the conditions of a motorized stage microscope OMS-500×500×100 (mm) and magnification of 50 to 100 times.

Here, T is a value obtained by measuring a distance between a straight line connecting outer boundaries of both ends of a cover portion in a first direction of a chip and a straight line connected to match a flat portion of a central portion in a height direction, and the unit of T is "μm."

TABLE 1

| T | Comparative Example | | Example | |
|---|---|---|---|---|
| Sample No. | Before Transfer | After Transfer | Before Transfer | After Transfer |
| 1 | 445.3 | 451.8 | 455.5 | 452.8 |
| 2 | 460.9 | 447.7 | 442.7 | 450.7 |
| 3 | 449.7 | 459.7 | 449.7 | 453.3 |

TABLE 1-continued

| T Sample No. | Comparative Example | | Example | |
|---|---|---|---|---|
| | Before Transfer | After Transfer | Before Transfer | After Transfer |
| 4 | 441.7 | 466.0 | 439.9 | 446.0 |
| 5 | 451.1 | 457.7 | 457.8 | 459.5 |
| 6 | 444.3 | 446.9 | 461.8 | 451.1 |
| 7 | 446.4 | 475.3 | 463.8 | 461.4 |
| 8 | 448.5 | 467.6 | 449.9 | 459.3 |
| 9 | 442.4 | 467.1 | 445.5 | 454.6 |
| 10 | 457.4 | 469.2 | 460.9 | 448.0 |
| Min | 441.7 | 446.9 | 439.9 | 446.0 |
| Max | 460.9 | 475.3 | 463.8 | 461.4 |
| Average | 448.8 | 460.9 | 452.7 | 453.7 |

Referring to Table 1, as a result of comparing sizes of T before and after the transfer process, it can be confirmed that a variation in T size in Example in which the margin portion manufacturing method according to an example embodiment of the present disclosure was performed is less than a variation in T size in Comparative Example in which the margin portion manufacturing method according to the related art was performed.

Here, W is a value obtained by measuring a distance between a straight line connecting outer boundaries of both ends of a cover portion in a third direction of a chip and a straight line connected to match a flat portion of a central portion in the third direction, and the unit of W is "μm."

TABLE 2

| W Sample No. | Comparative Example | | Example | |
|---|---|---|---|---|
| | Before Transfer | After Transfer | Before Transfer | After Transfer |
| 1 | 425.6 | 400.1 | 431.9 | 425.3 |
| 2 | 420.3 | 402.8 | 419.6 | 426.2 |
| 3 | 427.3 | 412.5 | 422.5 | 425.4 |
| 4 | 421.8 | 406.1 | 423.6 | 423.8 |
| 5 | 431.6 | 416.6 | 419.0 | 421.9 |
| 6 | 431.7 | 418.0 | 425.8 | 424.7 |
| 7 | 427.2 | 416.6 | 422.8 | 425.5 |
| 8 | 431.6 | 416.6 | 432.0 | 426.0 |
| 9 | 423.7 | 417.5 | 419.9 | 420.2 |
| 10 | 420.9 | 422.7 | 427.8 | 418.2 |
| Min | 420.3 | 400.1 | 419.0 | 418.2 |
| Max | 431.7 | 422.7 | 432.0 | 426.2 |
| Average | 426.2 | 413.0 | 424.5 | 423.7 |

Referring to Table 2, as a result of comparing sizes of W before and after the transfer process, it can be confirmed that a variation in W size in Example in which the margin portion manufacturing method according to an example embodiment of the present disclosure was performed is less than a variation in W size in Comparative Example in which the margin portion manufacturing method according to the related art was performed.

∠WT is a value obtained by measuring an angle of a position at which the straight lines of T and W meet, and the unit of ∠WT is "°" (degree).

TABLE 3

| ∠WT Sample No. | Comparative Example | | Example | |
|---|---|---|---|---|
| | Before Transfer | After Transfer | Before Transfer | After Transfer |
| 1 | 89.9 | 92.3 | 90.1 | 90.3 |
| 2 | 90.2 | 91.6 | 90 | 90.5 |
| 3 | 90 | 91.4 | 90.2 | 90.4 |
| 4 | 90.1 | 91.8 | 89.9 | 90.3 |
| 5 | 89.8 | 91.6 | 90.1 | 90.4 |
| 6 | 90.5 | 92.1 | 89.8 | 90.4 |
| 7 | 90.1 | 91.2 | 90.2 | 90.4 |
| 8 | 90.2 | 91.1 | 89.8 | 90.3 |
| 9 | 90.6 | 90.6 | 90 | 90.3 |
| 10 | 89.8 | 91.8 | 89.9 | 90.2 |
| Min | 89.8 | 90.6 | 89.8 | 90.2 |
| Max | 90.6 | 92.3 | 90.2 | 90.5 |
| Average | 90.1 | 91.6 | 90.0 | 90.4 |

Referring to Table 3, as a result of comparing sizes of ∠WT before and after the transfer process, it can be confirmed that a variation in ∠WT size in Example in which the margin portion manufacturing method according to an example embodiment of the present disclosure was performed is less than a variation in ∠WT size in Comparative Example in which the margin portion manufacturing method according to the related art was performed, and it can be confirmed that <90.0°±0.5° is satisfied.

In summary, it can be confirmed that a deformation rate of a chip when the margin portion manufacturing method according to an example embodiment of the present disclosure was performed is less than that the margin portion manufacturing method according to the related art was performed, and it can be confirmed that the completeness and yield of a multilayer electronic component are improved when the margin portion manufacturing method according to an example embodiment of the present disclosure was performed.

The term "an example embodiment" or "an experimental example" used herein does not refer to the same example embodiment, and is provided to emphasize a particular feature or characteristic different from that of another example embodiment. However, example embodiments provided herein are considered to be able to be implemented by being combined in whole or in part one with another. For example, one element described in a particular example embodiment, even if it is not described in another example embodiment, may be understood as a description related to another example embodiment, unless an opposite or contradictory description is provided therein.

The terms used herein is for the purpose of describing particular example embodiments only and is not to be limiting of the example embodiments. As used herein, the singular forms "a," "an," and "the" are intended to include the plural forms as well, unless the context clearly indicates otherwise.

What is claimed is:

1. A method of manufacturing a multilayer electronic component, the method comprising:
preparing a first ceramic green sheet on which a plurality of first internal electrode patterns are formed at predetermined intervals and a second ceramic green sheet on which a plurality of second internal electrode patterns are formed at predetermined intervals;
forming a ceramic green sheet stacked body by alternately stacking the first ceramic green sheet and the second ceramic green sheet in a first direction such that the first internal electrode patterns and the second internal electrode patterns overlap each other in the first direction;

cutting the ceramic green sheet stacked body such that ends of the first and second internal electrode patterns are exposed in a third direction, when a direction in which the first and second internal electrode patterns have a larger size is defined as a second direction and a direction in which the first and second internal electrode patterns have a smaller size is defined as the third direction;

disposing, on an elastic pad to which an adhesive is attached, a plurality of cut ceramic green sheet stacked bodies to be spaced apart from each other;

attaching a margin portion green sheet including a ceramic material, a photocuring agent, and a photoinitiator to at least one end surface of each of the plurality of cut ceramic green sheet stacked bodies in the third direction;

an energy irradiation operation of irradiating, with energy, the margin portion green sheet to generate a photocuring polymerization reaction between the photocuring agent and the photoinitiator; and preparing a body including a dielectric layer, a first internal electrode, and a second internal electrode and a margin portion by sintering the cut ceramic green sheet stacked body to which the margin portion green sheet is attached.

2. The method of claim 1, further comprising:
after the disposing of the plurality of cut ceramic green sheet stacked bodies to be spaced apart from each other,
scanning the plurality of cut ceramic green sheet stacked bodies disposed to be spaced apart from each other.

3. The method of claim 1, wherein the energy irradiation operation includes irradiating, with energy, only a region of the margin portion green sheet attached to the plurality of cut ceramic green sheet stacked bodies.

4. The method of claim 3, wherein
the margin portion green sheet is attached onto the carrier film, and
the method includes separating the carrier film to which the margin portion green sheet is attached from the cut ceramic green sheet stacked body, after the energy irradiation operation.

5. The method of claim 1, wherein the photocuring agent includes at least one monomer or oligomer among epoxy, acrylate, urethane, and thiol.

6. The method of claim 1, wherein the photoinitiator includes at least one of benzoin methyl ether, 2,2-dimethoxy-2-phenylacetophenone, 2-hydroxy-2-methyl-phenyl-propane-1-one, α-hydroxy-acetophenone, bis(2,6-dimethoxybenzoyl)-2,4,4-trimethylpentylphosphine oxide, 2,4,6-trimethylbenzoyldiphenylphosphine oxide, or bis(2,6-dichlorobenzoyl)-(4-propylphenyl)-phosphine oxide.

7. The method of claim 1, wherein a content of the photocuring agent satisfies 15 wt % to 26 wt % relative to the ceramic material included in the margin portion green sheet.

8. The method of claim 7, wherein a content of the photoinitiator satisfies 0.1 wt % to 5.0 wt % relative to the content of the photocuring agent.

9. The method of claim 1, wherein
after the energy irradiation operation,
∠WT satisfies 90.0°±0.5°, where among outermost edges of cross-sections of the cut ceramic green sheet stacked body in the first and third directions, an extension line of an edge in the first direction is defined as T, an extension line of an edge in the third direction is defined as W, and an angle defined by T and W is defined as ∠WT.

10. The method of claim 1, wherein the forming of the ceramic green sheet stacked body includes attaching a cover portion margin sheet to both end surfaces of the ceramic green sheet stacked body in the first direction.

11. The method of claim 1, further comprising:
after the preparing of the body and the margin portion,
applying first and second external electrode pastes to outer surfaces of the body in the second direction; and
preparing first and second external electrodes by sintering the first and second external electrode pastes.

12. The method of claim 11, further comprising:
after the preparing of the first and second external electrodes,
forming a first plating layer on the first external electrode; and
forming a second plating layer on the second external electrode.

13. A multilayer electronic component comprising:
a body including an active portion having capacitance formed by including a dielectric layer and first and second internal electrodes alternately disposed in a first direction with the dielectric layer interposed therebetween, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;
first and second external electrodes disposed on the third and fourth surfaces of the body in the second direction to be connected to the first and second internal electrodes, respectively; and
a margin portion disposed on both end surfaces of the active portion in the third direction,
wherein ∠WT satisfies 90.0°±0.5°, where among outermost edges of cross-sections of the body in the first and third directions, an extension line of an edge in the first direction is defined as T, an extension line of an edge in the third direction is defined as W, and an angle defined by T and W is defined as ∠WT, and
the margin portion includes a ceramic material, a photocuring agent, and a photoinitiator and is formed by a photocuring polymerization reaction between the photocuring agent and the photoinitiator.

14. The multilayer electronic component of claim 13, wherein the photocuring agent includes at least one monomer or oligomer among epoxy, acrylate, urethane, and thiol.

15. The multilayer electronic component of claim 13, wherein the photoinitiator includes at least one of benzoin methyl ether, 2,2-dimethoxy-2-phenylacetophenone, 2-hydroxy-2-methyl-phenyl-propane-1-one, α-hydroxy-acetophenone, bis(2,6-dimethoxybenzoyl)-2,4,4-trimethylpentylphosphine oxide, 2,4,6-trimethylbenzoyldiphenylphosphine oxide, or bis(2,6-dichlorobenzoyl)-(4-propylphenyl)-phosphine oxide.

16. The multilayer electronic component of claim 13, wherein a content of the photocuring agent satisfies 15 wt % to 26 wt % relative to the ceramic material included in the margin portion.

17. The multilayer electronic component of claim 16, wherein a content of the photoinitiator satisfies 0.1 wt % to 5.0 wt % relative to the content of the photocuring agent.

* * * * *